United States Patent Office 3,840,647
Patented Oct. 8, 1974

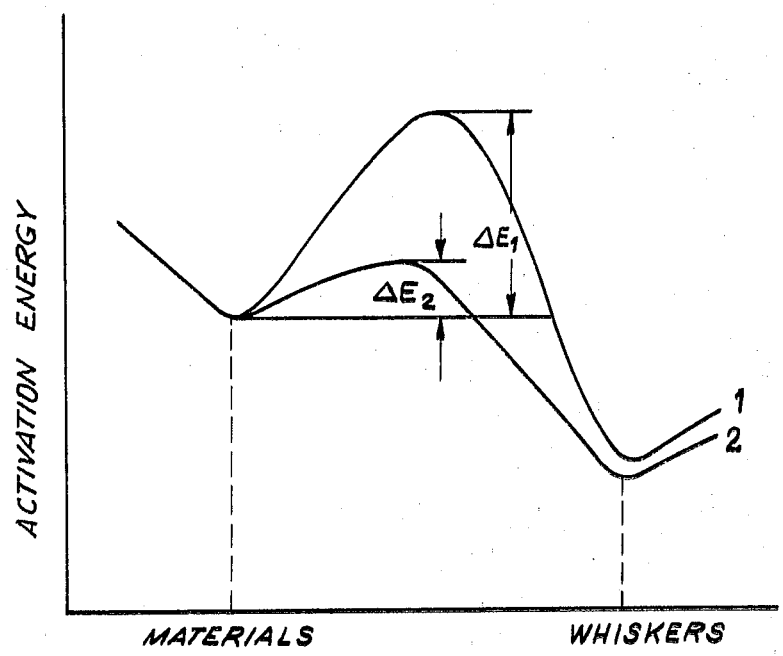

3,840,647
METHOD FOR PRODUCING WHISKERS
Chuji Tomita and Shuzo Koizumi, Suwa, Japan, assignors to Kabushiki Kaisha Suwa Seiksoha, Tokyo, Japan
Continuation-in-part of abandoned application Ser. No. 888,771, Dec. 29, 1969. This application May 19, 1972, Ser. No. 255,240
Claims priority, application Japan, Jan. 24, 1969, 44/4,912
Int. Cl. C01b 31/36
U.S. Cl. 423—291          8 Claims

ABSTRACT OF THE DISCLOSURE

A method of growing single-crystal whiskers of a variety of types from granular interdispersions, each interdispersion containing a catalyst and a component which can produce the whisker material when exposed to hydrogen at elevated temperature. It is essential that the components be in granular form and that the catalyst content lie within stated limits. The method is suitable for large-scale production.

CROSS-REFERENCE TO RELATED APPLICATION

This application is a continuation-in-part application of our co-pending application having the Ser. No. 888,771, filed Dec. 29, 1969, now abandoned.

BACKGROUND OF THE INVENTION

Whiskers of various types, including metals and carbon as well as metal carbides, have received considerable attention, largely because of the fact that they exhibit strengths which are close to the theoretical as based on the strength of bonds between individual atoms. Although a number of types of whiskers or filaments are already marketed commercially, the prices of such whiskers are extremely high due to the difficulty of producing them in quantity. Moreover, with respect to certain types of whiskers, reliable methods of producing whiskers substantially uniform in strength, diameter and length have not been available. A number of techniques have been studied in the attempt to produce single crystals of various materials in quantity. According to one theory, single crystals are produced as the result of a heterogeneous reaction involving solid, vapor and liquid phases. However, reactions have been shown to take place by growth from a liquid phase such as in U.S. 3,060,013, in which Harvey discloses growth of copper from a layer of molten lead in which presumably copper is dissolved. Fullman et al., in U.S. 2,842,469, disclose a method of making single crystals of iron in which ammonium halide must be present in the atmosphere. Mayer et al., in U.S. 3,063,866, form bismuth whiskers by a process which involves vacuum deposition.

Using techniques such as those described, it is difficult to ascertain the effect of impurities which might act as catalysts. Similarly, the effects of particle shape, particle size and distribution on the rate of growth and the type of whiskers produced cannot readily be discerned. Furthermore, where a three-phase process is involved, it becomes difficult to determine whether conditions in one phase rather than in another are controlling as to the type and rate of whisker growth produced.

SUMMARY OF THE INVENTION

Single-crystal whiskers of a metal or a carbide are grown by subjecting a composition including a hydrogen-reducible compound of the metal and a suitable catalyst to the effect of hydrogen at elevated temperature. To produce carbide whiskers the composition must contain carbon as well as the hydrogen-reducible compound of the metal and a catalyst. It is essential that the compositions consist of well-interdispersed granules. Suitable catalysts are Ni, Fe, Co, W and Pd as metals or as solid compounds in granular form.

Accordingly, an object of the present invention is to provide an improved method of producing single-crystal whiskers of a metal or a carbide.

Another object of the present invention is to provide an improved method of producing single-crystal whiskers of a metal or a carbide in large quantities.

A further object of the present invention is to provide an improved method of producing single-crystal whiskers of controlled diameter and length.

Still another object of the present invention is to provide an improved method of producing single-crystal whiskers of a metal or a carbide using compositions in granular form.

Yet another object of the present invention is to provide an improved method of producing single-crystal whiskers of a metal or a carbide wherein a catalyst is used, the concentration of catalyst being within effective limits.

Still other objects and advantages of the invention will in part be obvious and will in part be apparent from the specification.

The invention accordingly comprises the several steps and the relation of one or more of such steps with respect to each of the others thereof which will be exemplified in the method hereinafter disclosed, and the scope of the invention will be indicated in the claims.

BRIEF DESCRIPTION OF THE DRAWING

For a fuller understanding of the invention, reference is had to the following description taken in connection with the accompanying drawing, in which:

The single figure shows the activation energy for whisker formation in the presence of and in the absence of a catalyst.

DESCRIPTION OF THE PREFERRED EMBODIMENTS

In accordance with the present invention, it has been found that catalysts in granular form thoroughly interdispersed with reactive materials from which whiskers are to be produced can act as seeds which are effective for the growth of whiskers at high rate and in high quantity. For the catalyst to be effective, the granular size must be between about $\frac{1}{200}\mu$ and $5\mu$. If the diameter of a catalyst particle is less than about $\frac{1}{200}\mu$, then the particle is ineffective for producing whisker growth; conversely, if the particle is greater in diameter than about $5\mu$, then it can actually impede the growth of whiskers. In fact, little advantage is gained by having the catalyst particle size greater than about $2\mu$.

The method by which a catalyst acts in the growth of whiskers is illustrated in the single figure where curve 1 shows the potential barrier which must be traversed in transforming a granular material into a whisker. Curve 2 shows the potential barrier when a catalyst is used. The activation energy for the two reactions is $\Delta E_1$ and $\Delta E_2$, respectively. Where $\Delta E_2$ is much smaller than $\Delta E_1$, as in the present case, a far larger percentage of the atoms or molecules involved have the requisite energy to traverse the potential barrier and consequently the reaction is much more rapid.

In the method of the present invention, both the reactants and the catalysts are in the form of fine granules; consequently, by thoroughly interdispersing the catalyst particles and the reactant particles, the area of contact between the different solid phases is great and the desired reaction for the production of whiskers is effectively catalyzed. Following are examples showing how catalysts are used in the production of whiskers in accordance with the present invention:

EXAMPLE 1

Raw materials: Grams used
- WO$_3$ — 500
- NiCl$_2$ (as catalyst) — 0.5

WO$_3$ and NiCl$_2$ either separately or together are reduced in size to diameters ranging from about ½₀₀μ to 5μ and thoroughly interdispersed as by rolling in a mill. The interdispersed solid granules are placed in a hydrogen atmosphere where hydrogen gas is flowing at a rate of 100 to 1,000 liters/hour and the temperature is raised to between 950° and 1100° C. The system is kept under these conditions until the growth of whiskers is observed to be complete, or if desired, the growth can be terminated by decreasing the temperature.

Using a flow rate of 300 liters of hydrogen/hour at a temperature of 1,000° C., a crop of about 350 grams of whiskers having a diameter of 0.5 to 1μ and a length of 20 to 200μ is obtained.

EXAMPLE 2

Raw materials: Grams used
- WO$_3$ — 500
- PdCl$_2$ (as the catalyst) — 0.5

Whiskers can be grown in the range of hydrogen gas flows and temperatures given in Example 1. At a flow rate of 300 liters of hydrogen per hour and a temperature of 1,000° C., a crop of 350 grams of tungsten whiskers with a diameter of 1 to 1.5μ and a length of 20 to 300μ is obtained.

EXAMPLE 3

Raw materials: Grams used
- WO$_3$ — 500
- Pt powder (as the catalyst) — 0.5

The procedure is exactly as in Example 1. With a flow rate of 300 liters of hydrogen per hour at a temperature of 1,000° C., a crop of 200 grams of tungsten whiskers having a diameter of 1 to 3μ and a length of 20 to 100μ is obtained.

EXAMPLE 4

Raw materials: Grams used
- MoO$_2$ — 500
- NiCl$_2$ (as the catalyst) — 0.5

An interdispersion of MoO$_2$ and NiCl$_2$ prepared as above, is placed in a hydrogen atmosphere with the flow rate of hydrogen gas through the container being at 100 to 1,000 liters/hour and the temperature is raised to between 800° and 1100° C. The temperature and quantity of hydrogen used will affect the diameter and length of the molybdenum whiskers produced. With a flow rate of 300 liters of hydrogen per hour at a temperature of 900° C. a crop of about 250 grams of molybdenum whiskers having a diameter of 0.5 to 2μ and a length of 10 to 100μ is obtained.

Palladium and platinum may be used either as the metal or as the chloride in the same manner as the nickel chloride in the present example.

EXAMPLE 5

Raw materials: Grams used
- Si — 40
- SiO$_2$ — 10
- Graphite — 25
- FeCl$_3$ (as the catalyst) — 0.5

A mixture of granular Si, SiO$_2$, graphite, and FeCl$_3$ in the size range specified in Example 1 is placed in an atmosphere of hydrogen in an electric furnace and the temperature is raised to between 1300° and 1600° C. When the rate of flow of hydrogen gas is 50 liters/hour at a temperature of 1400° C. a large quantity of silicon carbide whiskers are obtained having a diameter of 0.5 to 2μ and a length of 5 to 50μ.

EXAMPLE 6

Raw materials: Grams used
- Si — 40
- SiO$_2$ — 10
- Graphite — 25
- NiCl$_2$ (as the catalyst) — 0.5

A mixture of granular Si, SiO$_2$, graphite and NiCl$_2$ in the particle size range specified in Example 1 is placed in an electric furnace and heated in a hydrogen atmosphere at a temperature between 1300° and 1600° C. When the reaction is carried out in the presence of the flow of hydrogen gas of 50 liters/hour at a temperature of 1400° C. a large quantity of silicon carbide whiskers having a diameter of 0.1 to 1 micron and a length of 5 to 30 microns is obtained. Palladium may be used as the catalyst in place of nickel with essentially the same results so far as she quantity and size of carbide whiskers is concerned.

EXAMPLE 7

Raw materials: Grams used
- Si — 40
- SiO$_2$ — 10
- Graphite — 25
- CoCl$_3$ (as the catalyst) — 0.5

The granular interdispersion of Si, SiO$_2$, graphite and CoCl$_3$ having particle sizes in the range specified in Example 1 is placed in an electric furnace and heated in a hydrogen atmosphere at a temperature between 1300° and 1600° C. Cobalt is less effective as the catalyst for the growth of silicon carbide whiskers than are iron, nickel and palladium catalysts. When the reaction is carried out in a flow of hydrogen at 50 liters per hour at a temperature of 1400° C. a relatively small crop of silicon carbide whiskers having a diameter of 1 to 2 microns and length of 5 to 20 microns is obtained.

Manganese is about as effective as cobalt as a catalyst.

EXAMPLE 8

Raw materials: Grams used
- Si — 40
- SiO$_2$ — 10
- Graphite — 25
- WO$_3$ — 0.5

A granular interdispersion of Si, SiO$_2$, graphite and WO$_3$ in the size range specified in Example 1 is put into an electrical furnace and heated in a hydrogen atmosphere at a temperature in the range of 1300° to 1600° C. When the reaction is carried out in an atmosphere of hydrogen flowing at a rate of 50 liters per hour at a temperature of 1400° C., a large quantity of silicon carbide whiskers having a diameter of 0.1 to 1 micron and a length of 5 to 50 microns is obtained. Molybdenum oxide is about as effective as tungsten oxide as the catalyst in this particular reaction.

EXAMPLE 9

Raw materials: Grams used
- B — 40
- B$_2$O$_3$ — 10
- Graphite — 20
- NiCl$_2$ (as the catalyst) — 0.5

A granular interdispersion of B, B$_2$O$_3$, graphite and NiCl$_2$ having a size range within that specified in Example 1 is placed in an electric furnace and heated in an atmosphere of hydrogen at a temperature between 1300° and 1600° C. When the reaction is carried out at a flow of 50 liters of hydrogen per hour at a temperature of 1450° C. boron carbide (B$_4$C) whiskers having a diameter of 0.1 to 1 micron and a length of 5 to 30 microns are obtained. Iron, palladium, tungsten and molybdenum are about as effective as nickel for this particular reaction.

In Examples 5 and 6, SiO can be substituted for SiO$_2$.

In Examples 5, 6, 7, 8 and 9, the reaction can be carried out in a sealed chamber initially containing air or hydrogen. The oxygen in the air will, of course, be converted into carbon monoxide and carbon dioxide as the temperature is raised and finally as it is lowered. At the peak temperature, of course, carbon dioxide is unstable.

In Examples 5 through 9, charcoal, carbon black or a carbohydrate may substituted for graphite. Where a carbohydrate is used, it is desirable to increase the quantity so that the carbon content in the system is the same as if one of the pure carbon materials were used.

In the method disclosed in the present invention, the catalyst controls both the reaction and the formation of the whiskers. The catalyst may be added as elements or as compounds which can be reduced either by reaction by the raw materials or by the hydrogen atmosphere specified. For example, nickel halide catalysts for the formation of tungsten whiskers are all reduced to metallic nickel by hydrogen gas. However, it should be noted that where the catalysts are added as compounds, contact between the granules of the different materials may be less extensive which can have an effect on the rate of growth of whiskers.

In general, the quantity of catalyst used is best expressed in terms of atomic percentage based on the material of which the whiskers are composed. For example, the quantity of catalyst for the preparation of tungsten or molybdenum whiskers should be between $1 \times 10^{-3}$ atomic percent and 2 atomic percent. If the quantity of catalyst is less than about $1 \times 10^{-3}$ atomic percent whiskers are rarely produced. On the other hand, if the quantity of catalyst is greater than about 2 atomic percent, the qauntity of whiskers produced is less and the tungsten and molybdenum whiskers tend to be angular. The lower limit for the quantity of catalyst to be used in the production of SiC or $B_4C$ is again about $1 \times 10^{-3}$ atomic percent. The upper limit is about 5 atomic percent. The quantity of whiskers produced decreases rapidly if this content is exceeded.

As is evident from the above remarks, the most effective range in general is $1 \times 10^{-3}$ to 5 atomic percent for the quantity of catalyst based on the principal element in the whiskers produced. Apparently, the catalyst condenses either at the top or the bottom of whiskers as the whiskers grow. As a result, the use of catalysts in the form given is also suitable where vapor mechanisms and liquid mechanisms are involved.

The Examples presented include tungsten whiskers, molybdenum whiskers, silicon carbide whiskers and boron carbide whiskers. However, as is apparent, the methods of the present invention can be applied to the formation of whiskers of other materials as well, provided that the reactants can be prepared in the proper size range and thoroughly interdispersed. Testing has shown that whiskers prepared in accordance with the present invention are as effective for the reinforcement of various composites as are those produced by prior methods. Furthermore, growth is sufficiently rapid and the yields are sufficiently great so that the cost of whiskers produced by the present methods is substantially lower.

It should be noted that all of the catalysts specified are either transition metals or compounds thereof. It is reasonable to expect that all transition metals or compounds thereof will show similar catalytic effect.

It will thus be seen that the objects set forth above, among those made apparent from the preceding description, are efficiently attained and, since certain changes may be made in carrying out the above method without departing from the spirit and scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A method of growing carbide whiskers of silicon and of boron comprising the steps of preparing an interdispersion of materials reactable to form carbide whiskers in the presence of a suitable catalyst, all materials including catalyst being in the form of granules ranging in size from $\frac{1}{200}\mu$ to $5\mu$, said interdispersion including carbon in the form of a member of the group consisting of graphite, carbon black, charcoal and a carbohydrate thermally decomposable to carbon at sufficiently high temperature, said catalyst being selected from the group consisting of Ni and compounds thereof reducible to Ni when exposed to $H_2$ at high temperature when boron carbide is to be formed, and said catalyst being selected from the group consisting of Ni, Pd, Co and Fe compounds reducible to Ni, Pd, Co, or Fe in the presence of $H_2$ at high temperature, $WO_3$ and $MiO_2$, when silicon carbide is to be formed, said catalyst for preparing whiskers of either boron or silicon carbide being present in quantity from $1 \times 10^{-3}$ to 2 atomic percent, and an element selected from the group consisting of Si and B of which a carbide is to be formed, said element being present in both the elementary and an oxide form, and exposing said interdispersion to hydrogen at elevated temperature for a period of time sufficient to achieve the desired growth.

2. The method as described in claim 1 wherein said interdispersion consists essentially of 40 parts by weight of Si, 10 parts by weight of SiO, 25 parts by weight of graphite and 0.5 parts by weight of a catalyst selected from the group consisting of $NiCl_2$, Pd and $CoCl_3$.

3. The method as described in claim 1, wherein said whisker produced is boron carbide and said solid mixture consists of B, $B_2O_3$, and a material selected from the group consisting of graphite, charcoal, carbon black and a carbohydrate, all in granular form.

4. The method as described in claim 1, wherein said whisker produced is a member selected from the group consisting of silicon carbide and boron carbide and said elevated temperature lies between 1300° C. and 1600° C.

5. The method as described in claim 1, wherein said hydrogen in said hydrogen atmosphere is moved over said interdispersion at a rate of about 100 to 1,000 liters per hour for a batch of interdispersed granular materials weighing about 500 grams.

6. The method as described in claim 1, wherein said interdispersion consists essentially of 40 grams of Si, 10 grams of $SiO_2$, 25 grams of graphite and 0.5 grams of $FeCl_3$.

7. The method as described in claim 1, wherein said interdispersion consists essentially of 40 grams of Si, 10 grams of $SiO_2$, 25 grams of graphite and 0.5 grams of $CoCl_3$.

8. The method as described in claim 1, wherein said interdispersion consists essentially of 40 grams of B, 10 grams of $B_2O_3$, 20 grams of graphite and 0.5 grams of $NiCl_2$.

References Cited
UNITED STATES PATENTS

| | | | |
|---|---|---|---|
| 3,409,395 | 11/1968 | Shyne et al. | 423—345 |
| 3,423,179 | 1/1969 | Webb | 423—291 |
| 2,813,811 | 11/1957 | Sears | 148—1.6 |
| 2,813,811 | 11/1957 | Sears | 148—1.6 |
| 2,842,468 | 7/1958 | Brenner | 148—1.6 |
| 2,842,469 | 7/1958 | Fullman et al. | 148—1.6 |
| 3,147,085 | 9/1964 | Gatti | 148—1.6 X |
| 3,201,665 | 8/1965 | Venables | 148—1.6 X |

L. DEWAYNE RUTLEDGE, Primary Examiner

J. M. DAVIS, Assistant Examiner

U.S. Cl. X.R.

75—0.5; 148—1.6; 423—345